United States Patent [19]

Lyons

[11] Patent Number: 6,141,723
[45] Date of Patent: Oct. 31, 2000

[54] VIRTUAL MACHINE SYSTEM FOR ACCESSING EXTERNAL SUBPROGRAM FUNCTIONS

[75] Inventor: David J. Lyons, Des Moines, Iowa

[73] Assignee: Microware, Des Moines, Iowa

[21] Appl. No.: 09/056,435

[22] Filed: Apr. 7, 1998

[51] Int. Cl.$^7$ .................................................. G06F 12/00
[52] U.S. Cl. ................................ 711/6; 711/102; 711/104
[58] Field of Search .............................. 711/6, 102, 104; 709/1; 395/705

[56] References Cited

U.S. PATENT DOCUMENTS

| | | | |
|---|---|---|---|
| 5,327,562 | 7/1994 | Adcock ..................................... | 395/708 |
| 5,500,948 | 3/1996 | Hinton et al. ............................ | 711/205 |
| 5,920,720 | 7/1999 | Toutonghi et al. ..................... | 395/705 |
| 5,974,536 | 10/1999 | Richardson ............................. | 712/215 |

*Primary Examiner*—John W. Cabeca
*Assistant Examiner*—Fred F. Tzeng
*Attorney, Agent, or Firm*—Daniel A. Rosenberg; Kent A. Henrink; Davis, Brown Law Firm

[57] ABSTRACT

A virtual machine system for accessing program functions. The system couples ROM memory to RAM memory in a manner which allows the memory to be independently removed and updated. A virtual machine and class module are stored in the ROM memory. A first static storage allocation in the RAM memory is associated with the virtual machine and a second static storage allocation in the RAM memory is associated with the class module. During startup, the virtual machine searches for a module of a given name. If the module is found, a given function is called in the class module so that the address of static storage associated with the class module can be saved in the static storage associated with the virtual machine. The address is used later when another function is called. The static storage associated with the class module has a table of pointers to external functions. There is one pointer for every external function. If an address of an external function is not known, the address of the external function is looked up by name, and the resulting pointer is saved in the table of pointers, so that the address of the external function does not have to be looked up again. The table of pointers is kept in the static storage associated with the class module. To access the table of pointers, calling support code gets the address of the static storage associated with the class module from the static storage associated with the virtual machine.

9 Claims, 3 Drawing Sheets

VIRTUAL MACHINE SYSTEM FOR ACCESSING EXTERNAL SUBPROGRAM FUNCTIONS

BACKGROUND OF THE INVENTION

1. Field of the Invention

The present invention relates in general to a virtual machine system for accessing external subprogram functions and, more particularly, to a bootable virtual machine system allowing independent access to and update of ROM memory and RAM memory.

2. Description of the Prior Art

Some object-oriented computer languages, such as JAVA, utilize classes which cannot be executed directly from read-only ("ROM") memory. To create a bootable operating system using such computer languages, known techniques have been developed to store object-oriented class files in ROM. These class files are stored in a module in a manner which allows the class files to be executed directly from ROM. Such modules are often referred to as "ROMmed" modules. Main memory RAM is typically coupled to the ROMmed module to allow execution of functions. While ROMmed modules do allow the creation of bootable operating systems using classes, systems utilizing such ROMmed modules have several drawbacks.

One drawback with such prior art systems is the difficulty in accessing and/or updating the RAM and ROM memory independently of one another. Prior art systems typically include a RAM portion and a ROM portion. The ROM portion typically includes proprietary class files while the RAM memory is utilized to execute various functions in association with a particular program. Because of the distinct aspects of the two types of memory, it often becomes desirable to update and/or access one type of memory without disturbing the other. In prior art systems, the ROM memory and RAM memory are so integrally connected that it is not possible to readily separate the two types of memory for independent access or update.

While it would be desirable to separate the two types of memory, an additional problem associated with prior art systems is that such systems do not provide means for separating out the aspects of the system required for accessing external functions. Accordingly, even if prior art systems could be divided into integral RAM and ROM components, it would not be possible to update one without having detailed knowledge of the workings of the other. Since many such systems contain proprietary information in the ROM module, it would be desirable to provide means for updating the ROM module without requiring access to such proprietary information.

The difficulties encountered in the prior art noted herein above are substantially eliminated by the present invention.

SUMMARY OF THE INVENTION

The present invention provides a ROM memory coupled to a RAM memory. A virtual machine and class module are stored within the ROM memory. The RAM memory is provided with a first static storage allocation associated with the virtual machine, and a second static storage allocation associated with the class module. A table of pointers, including a target pointer, is stored in the second static storage allocation. A target function is provided and associated with the target pointer. Means are provided for locating an address of the target function. Means are provided for generating a stub to the target function and for associating the stub with the target pointer. Calling means are provided for executing the target function using the stub associated with the target pointer.

In the preferred embodiment, a table pointer is provided within the first static storage allocation. Means are provided for locating the address of the table of pointers and associating this address with the table pointer. Means are also provided for locating the table pointer.

DETAILED DESCRIPTION OF THE PRESENT INVENTION

Figure 1:
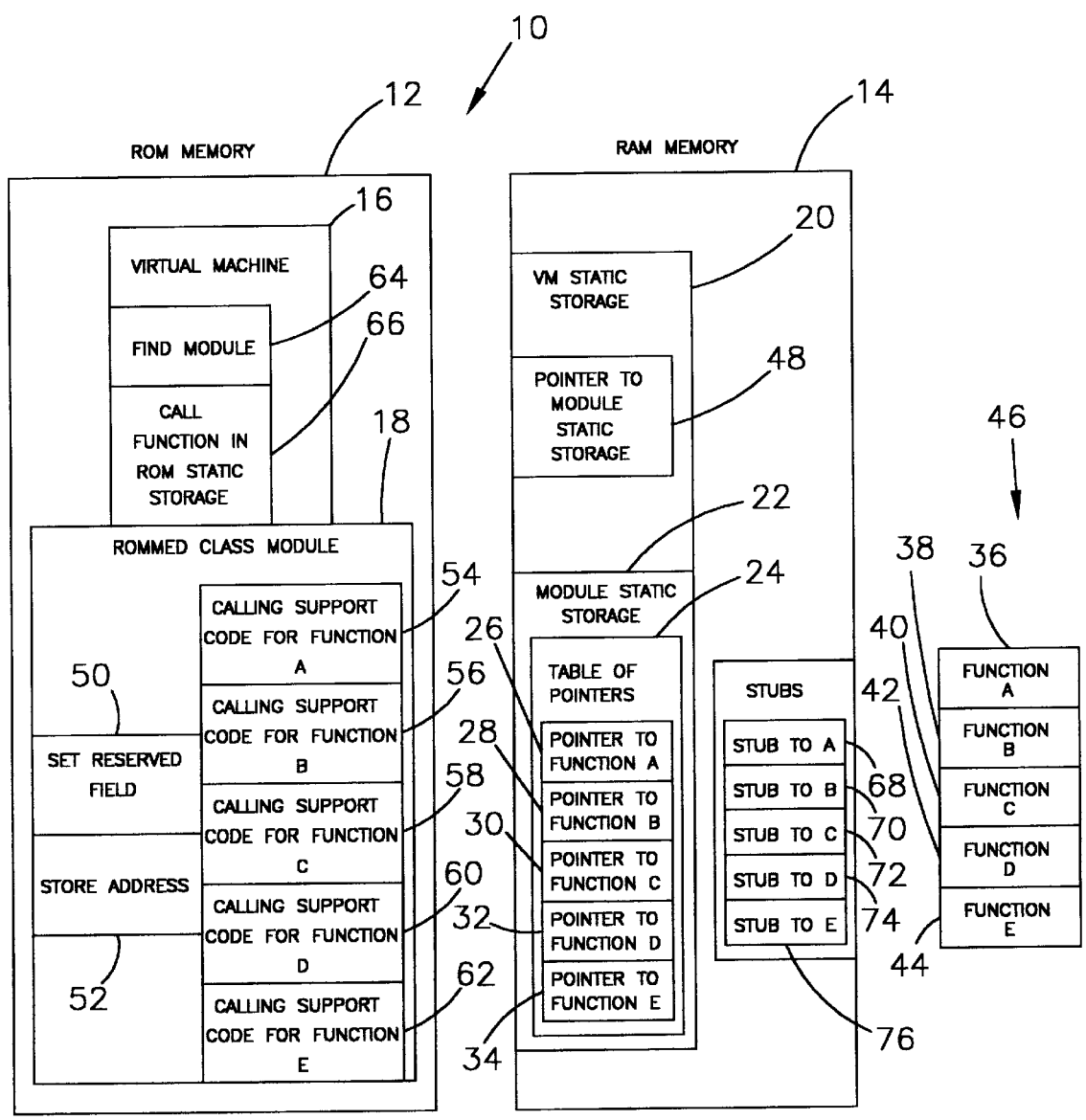
FIG. 1 is a block diagram of an embodiment according to the present invention.

A bootable virtual machine system for accessing external subprogram functions is shown schematically as (10) in FIG. 1. The system (10) includes ROM memory (12) coupled to RAM memory (14). As shown in FIG. 1, the ROM memory (12) includes a virtual machine (16) and a ROMmed class module (18). Separating the virtual machine (16) from the ROMmed class module (18) allows a user to update or replace the ROMmed class module (18) without complex linking procedures and without requiring access to the virtual machine which may contain proprietary information.

As shown in FIG. 1, an area of RAM memory (14) is allocated to the virtual machine (16). This area of RAM memory (14) is referred to as the virtual machine static storage (20). Similarly, an area of RAM memory (14) is allocated to the ROMmed class module (18). This area of RAM memory (14) is referred to as the module static storage (22).

Stored in the module static storage (22) is a table (24) of pointers (26), (28), (30), (32), and (34) to respective external functions (36), (38), (40), (42) and (44) (FIG. 1). Preferably, the table of pointers (24) is created at run time as machine generated Assembly language. The functions may be stored in the virtual machine (16) in an external library (46), or in any other suitable memory location. The functions may be JAVA native methods or any desired function. Stored in the virtual machine static storage (20) is a pointer (48) to the module static storage (22). Stored in the ROMmed class module (18) are several functions, (50), (52), (54), (56), (58) (60) and (62). As shown in FIG. 1, provided in the virtual machine are two functions (64) and (66).

In prior art applications, the virtual machine is integrally coupled to, and not readily separable from the ROMmed class module. In accordance with a preferred embodiment of the present invention, a novel system is employed to separate the virtual machine (16) from the ROMmed class module (18) (FIG. 1). This separation allows either the virtual machine (16) or the ROMmed class module (18) to be independently updated and/or customized. The separation also allows the ROMmed class module (18) to be updated or modified without the need to access the virtual machine (16) or any potentially proprietary code contained therein.

Figure 2:
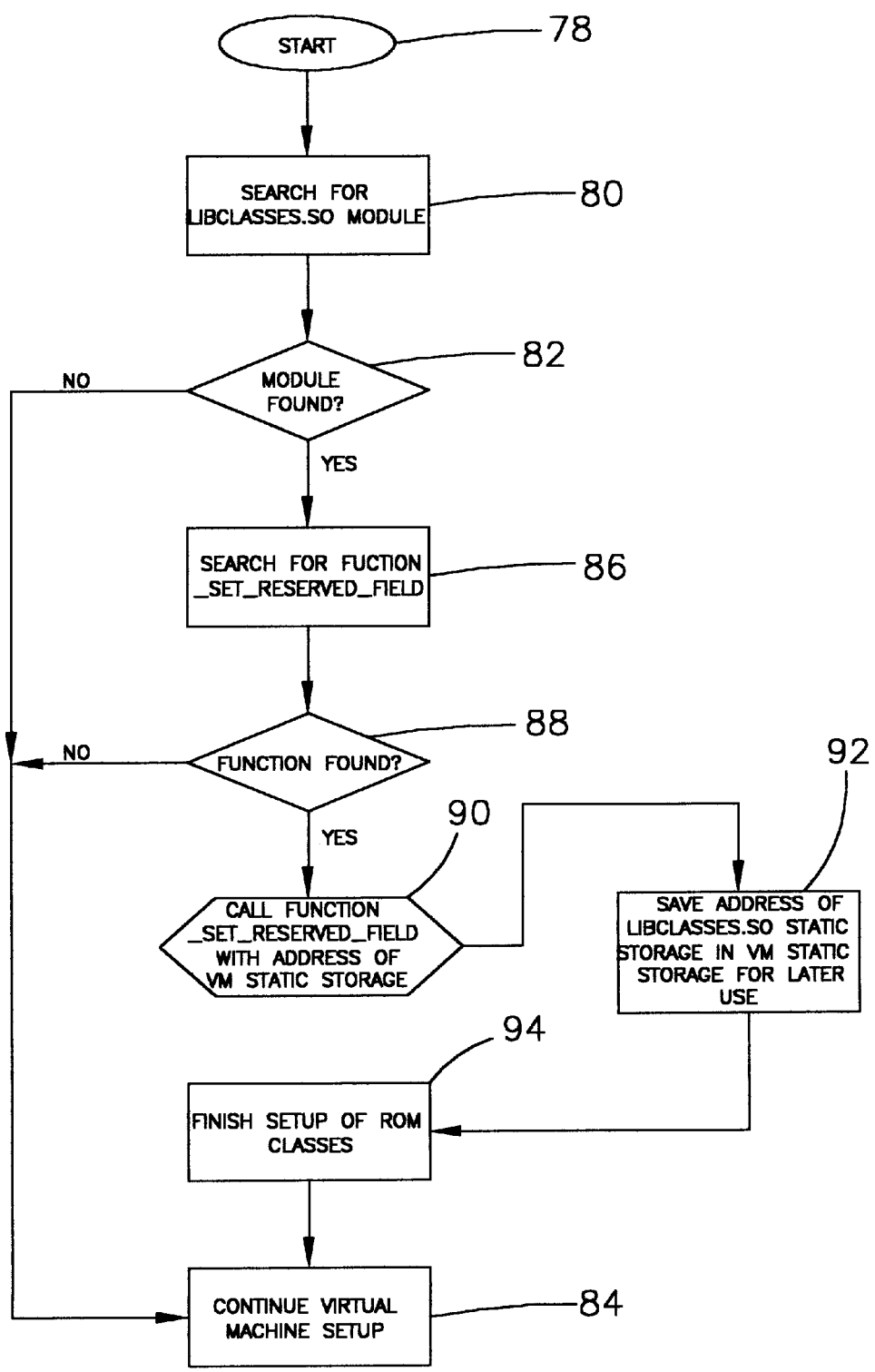
FIG. 2 is a flow chart showing the initial ROM module set-up of the present invention.
Figure 3:
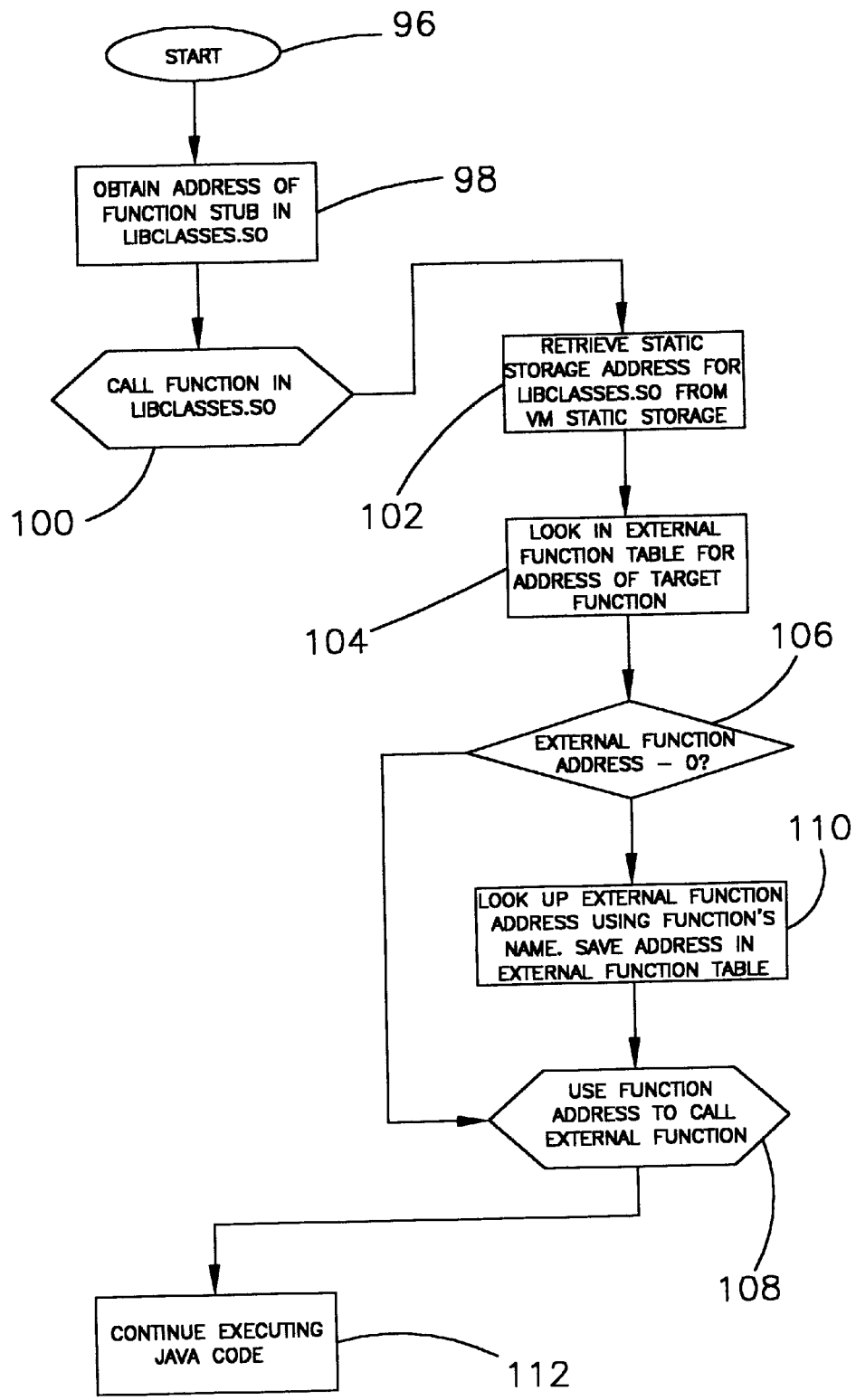
FIG. 3 is a flow chart showing generation of the stub and execution of the target function.

Referring now to FIG. 2, there is depicted a high-level flow chart of the initial ROM module setup in accordance with a preferred embodiment of the present invention. The initial ROM module setup initializes the pointer (48) with the address of the module static storage (22) (FIGS. 2–3). Since the pointer (48) in the virtual machine static storage (20) can be initialized with the address of the module static storage (22), the ROMmed class module (18) can be readily replaced or updated, without significantly affecting operation of the virtual machine (16). Speed of operation is another advantage of initializing the pointer (48) with the address of the module static storage (22). By simply storing the address of the module static storage (22) in the static storage (20) of the virtual machine (16), the table of pointers (24) and any associated stubs (68), (70), (72), (74) and (76) can be dynamically generated at run time. The necessity for compiling all aspects of the system before run time is thereby eliminated.

As illustrated in FIGS. 2–3, the process of the present invention is divided into two parts. The first part, the initial setup of the ROM module, is depicted in FIG. 2 and the second part, the execution of a target function from the ROM module, is depicted in FIG. 3. The initial setup of the ROM module divides the various processes into two categories. As designated in FIG. 2–3, the processes located on the left side of these figures depict computer code contained within the virtual machine (16). Those processes located on the right side of these figures depict computer code contained within the ROMmed class module (18).

The purpose of the initial setup depicted in FIG. 2 is to determine the address of the ROMmed class module (18) and initialize the pointer (48) with this address (FIGS. 1–2). The purpose of executing the target function in the ROMmed class module (18), as depicted in FIG. 3, is twofold (FIGS. 1 and 3). The first purpose is to call the target function, and the second purpose is to generate the target stub (68) to the target function (36) make the target function (36) easier to locate the next time it is called. These processes are detailed below.

As illustrated in FIGS. 1–2, the process of the present invention begins in block (78) by running computer code located within the virtual machine (16). The process proceeds to block (80), which illustrates execution of the FIND MODULE function (64). The FIND MODULE function (64) is located in the virtual machine (16), and searches for the ROMmed class module (18). Once the FIND MODULE function (64) locates the ROMmed class module (18), a portion of the static storage (20) is allocated to the virtual machine (16) and a portion of the static storage (22) is allocated to the ROMmed class module (18).

Thereafter, the process proceeds to block (82), which depicts a determination of whether or not the FIND MODULE function (64) is able to locate the module static storage (22). If the module static storage (22) is not found, the virtual machine setup continues as illustrated in block (84). If the module static storage (22) is found, the process proceeds to block (86), which depicts virtual machine code searching for the SET RESERVED FIELD function (50). The SET RESERVED FIELD function (50) determines the address of the module static storage (22) and initializes the pointer (48), located within the virtual machine static storage (20) with this address.

Thereafter, the process proceeds to block (88), which illustrates a determination of whether or not the SET RESERVED FIELD function (50) can be located. If the SET RESERVED FIELD function (50) cannot be located, the process proceeds to block (84), and setup of the virtual machine (16) continues. If the SET RESERVED FIELD function (50) is located, the process proceeds to block (90) which illustrates calling the SET RESERVED FIELD function (50) with the address of the virtual machine static storage (20).

Then, as illustrated in block (92), computer code located in the ROM memory (12), namely the SET RESERVED FIELD function (50), initializes the pointer (48) with the address of the module static storage (22). Next, the process proceeds to block (94) for completion of the setup of the ROMmed classes. Finally, the process proceeds to block (84) where setup of the virtual machine continues. While the functions of the present invention may be written in any suitable computer language, in the preferred embodiment, the FIND MODULE function (64) and the SET RESERVED FIELD function (50) are written in Assembly language.

A pseudo-code representation of the initial setup of the ROM module is given in Table I.

TABLE I

```
Initial ROM Module Setup
  //Function stored in the virtual machine
  void startRomClasses() {
    result = findModule("libclasses.so");
    if (result != MODULE_NOT_FOUND) {
      funcAddr = findFunction("__set_reserved_field");
      if (funcAddr != FUNCTION_NOT_FOUND) {
        funcAddr(staticStorage);
      }
    }
  }
}//Function in the ROMmed class module libclasses.so
  void __set_reserved_field(storage) {
    storage.staticAddress = staticStorage;
  }
```

Once the initial ROM module setup is completed, the present invention executes the target function A (36) as shown in FIGS. 1 and 3. Once target function A (36) has been executed once, executing target function A (36) a subsequent time simply involves locating target pointer A (26) within the module static storage (22) and locating target function A (36) using the associated machine-generated target function stub (68). The first time target function A (36) is executed, however, target pointer A (26) is initialized to zero and target function A stub (68) does not exist. Therefore, target function A (36) must be looked up by name and the resulting address used to generate target function A stub (68) and associate target function A stub (68) with target pointer A (26).

The process begins in block (96) running code located in the virtual machine (16) and proceeds to block (98). As illustrated in block (98), when it is desired to call target function A (36), code inside the virtual machine (16) attempts to obtain the address of target function A stub (70). To retrieve the address of target function A stub (68), the process proceeds to block (100), which calls target function A (36) identified in the table of pointers (24). Thereafter, the process proceeds to block (102). Blocks (102), (104), (106), (108) and (110) represent processes executed by target function A calling support code (54). Separate and distinct calling support code (54), (56), (58), (60) and (62) is provided for each external function (36), (38), (40), (42) and (44). Block (102) represents execution of code inside the ROMmed class module (18) to retrieve the address of the pointer (48) located within the virtual machine static storage (20). With the address of the pointer (48) known, the table of pointers (22) located in RAM static storage can be readily located.

Each piece of calling support code (54), (56), (58), (60) and (62) includes four distinct functions. These functions are the RETRIEVE ADDRESS function, the LOOK UP function, the STUB GENERATION function and the CALL FUNCTION function. The operation of these functions is depicted in Blocks (102), (104), (106), (108) and (110) and is explained below.

Once the address of the pointer (48) is obtained, the process proceeds to block (104). Block (104) depicts operation of the RETRIEVE ADDRESS function of the target function A calling support code (54). The RETRIEVE ADDRESS function uses the pointer (48) to locate the table of pointers (24). Thereafter, the RETRIEVE ADDRESS function scans the table of pointers (24) to obtain the address of target function A (36). The process then proceeds to block (106) which illustrates a determination of whether or not target function stub (68) has been generated and associated with the target pointer (26). All of the pointers (26), (28), (30), (32) and (34) are initially set to zero. If the target pointer (26) has a value other than zero, meaning target function A stub (68) has already been generated and associated with the target pointer A (26), the process proceeds to block (108). Block (108) depicts use of the target pointer A (26) to call target function A (36).

If, however, target pointer A (26) is zero, no stub has been generated. The process then proceeds to block (110). Block (110) depicts execution of the LOOK UP function which locates the address of target function A (36) by name. Thereafter, the STUB GENERATION function uses the address of target function A (36) to generate target function A stub (68) and associate target function A stub (68) with target pointer A (26). Accordingly, the next time the target function (36) is called, target function A stub (68) provides the address of target function A (36), thereby saving the time required for execution of the LOOK UP and STUB GENERATION functions. By dynamically generating the stubs (68), (70), (72), (74) and (76) at run time, the target function A calling support code (54) eliminates the need to compile the entire table of pointers (24) before running the system (10).

Once the LOOK UP function has located the address of target function A (36) and the STUB GENERATION function has associated target function A stub (68) with target pointer A (26), the process proceeds to block (108). Block (108) depicts execution of the CALL function to use of target pointer A (26) and target function A stub (68) to call target function A (36). Thereafter, the process proceeds to block (112) wherein the system (10) continues executing the remaining code. While the functions of the present invention may be written in any suitable computer language, in the preferred embodiment, the RETRIEVE ADDRESS, LOOK UP and CALL functions are created at run time as machine generated Assembly language. The STUB GENERATION function is preferably written in the C computer language.

A pseudo-code representation of function A execution (36) is given in Table II.

TABLE II

Executing Functions in ROMmed Class Module
//Function stored in the virtual machine.
   void callNamedFunction(funcName) {
     funcAddr = findFunction(funcName);
     funcAddr();
   }
//Function stored in the ROMmed class module
   void callFunctionXX() {
     staticStorage = staticStorage.staticAddress;
     if (funcTable[XX] = 0) {
       funcAddr = findFunction ("functionXX");
       funcTable[XX] = funcAddr;
     }

TABLE II-continued funcAddr = funcTable[XX];
     funcAddr();
   }

The foregoing process is repeated for execution of functions B (38), C (40), D (42) and E as these functions are called. The respective calling support code (56), (58), (60) and (62) is used to generate the respective function stubs (70), (72), (74) and (76) and associate the respective pointers (28), (30), (32) and (34).

The foregoing description and drawings merely explain and illustrate the invention and the invention is not limited thereto, except insofar as the claims are so limited, as those skilled in the art who have the disclosure before them will be able to make modifications and variations therein without departing from the scope of the invention. For example, it is anticipated that the foregoing invention may be used with any suitable computer language and any available ROM memory and virtual machine. It is additionally anticipated that any number of ROMmed class modules may be stored in ROM static storage and operated upon as described above.

What is claimed is:

1. A method of controlling a virtual machine system for accessing program functions, said method comprising:
   providing a ROM memory with computer memory allocated for,
     a software virtual machine for interpreting compiled computer instructions; and
     a rommed class module for storage of said compiled computer instructions, wherein said rommed class module is de-linked from, and independently upgradable with regard to, said virtual machine;
   providing a RAM memory in operable communication with said ROM memory, finding the memory location of said rommed class module;
   allocating memory for a first static storage area associated with said virtual machine;
   allocating memory for a second static storage area associated with said rommed class module;
   finding the memory location of a set reserved field function; and
   executing said set reserved field function, thereby assigning to a first pointer the memory address of said second static storage area.

2. The invention in accordance with claim 1 further comprising the steps of locating and executing a program function, said steps comprising:
   retrieving the contents of said first pointer, whereby said contents of said first pointer points to a table of pointers for the storage of memory addresses of a plurality of program functions;
   retrieve the contents of a pointer within said table of pointers; and
   determining if said pointer within said table of pointer is set to a null value, and if so:
     determining the memory location of a program function by looking up the name of said program function;
     associate a stub with said pointer within said table of pointers; and
     assigning said memory location to said pointer within said table of pointers;
   calling said program function at said memory address stored in said pointer within said table of pointers.

3. The invention in accordance with claim 2 wherein said plurality of program functions are externally located.

4. The invention in accordance with claim 1 wherein said step of finding the memory location of said rommed class module is performed by a function stored in said virtual machine.

5. The invention in accordance with claim 1 wherein said first static storage area is located in said RAM memory.

6. The invention in accordance with claim 1 wherein said second static storage area is located in said RAM memory.

7. The invention in accordance with claim 1 wherein said set reserved field function is located within the rommed class module.

8. The invention in accordance with claim 1 wherein said first pointer is located in said first static storage area.

9. A method of controlling a virtual machine system for accessing program functions, said method comprising:

providing a ROM memory with computer memory allocated for, a software virtual machine for interpreting compiled computer instructions; and a rommed class module for storage of said compiled computer instructions, wherein said rommed class module is de-linked from, and independently upgradable with regard to, said virtual machine;

providing a RAM memory in operable communication with said ROM memory, finding through a function located in said virtual machine the memory location of said rommed class module;

allocating in said RAM memory a first static storage area associated with said virtual machine;

allocating in said RAM memory a second static storage area associated with said rommed class module;

finding the memory location of within said rommed class module a set reserved field function;

executing said set reserved field function, thereby assigning to a first pointer located in said first static storage area the memory address of said second static storage area;

retrieving the contents of said first pointer, whereby said contents of said first pointer points to a table of pointers for the storage of memory addresses of a plurality of external program functions;

retrieve the contents of a pointer within said table of pointers; and determining if said pointer within said table of pointer is set to a null value, and if so:

determining the memory location of a program function by looking up the name of said program function;

associate a stub with said pointer within said table of pointers; and assigning said memory location to said pointer within said table of pointers;

calling said program function at said memory address stored in said pointer within said table of pointers.

\* \* \* \* \*